(12) United States Patent
Chuang

(10) Patent No.: US 6,508,571 B2
(45) Date of Patent: Jan. 21, 2003

(54) ILLUMINATING APPARATUS FOR A PROJECTION DISPLAY

(75) Inventor: Fu-Ming Chuang, Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 09/820,984

(22) Filed: Mar. 30, 2001

(65) Prior Publication Data

US 2002/0071274 A1 Jun. 13, 2002

(51) Int. Cl.[7] .............................................. G03B 21/28
(52) U.S. Cl. ..................... 362/237; 362/554; 362/560; 353/1; 353/33
(58) Field of Search .......................... 362/19, 560, 554, 362/562, 268; 349/5, 8, 9; 353/1, 616, 33, 34, 37, 38, 99, 8, 102, 98, 20

(56) References Cited

U.S. PATENT DOCUMENTS

| | | | | |
|---|---|---|---|---|
| 4,111,538 A | * | 9/1978 | Sheidon | 353/122 |
| 5,634,704 A | * | 6/1997 | Shikama et al. | 353/31 |
| 5,829,858 A | * | 11/1998 | Levis et al. | 353/122 |
| 5,902,033 A | * | 5/1999 | Levis et al. | 353/122 |
| 6,053,615 A | * | 4/2000 | Peterson et al. | 353/20 |
| 6,224,216 B1 | * | 5/2001 | Parket et al. | 353/31 |
| 6,238,063 B1 | * | 5/2001 | Tanitsu | 362/268 |
| 6,318,863 B1 | * | 11/2001 | Tiao et al. | 353/31 |
| 6,343,862 B1 | * | 2/2002 | Sawai et al. | 353/1 |

* cited by examiner

*Primary Examiner*—Sandra O'Shea
*Assistant Examiner*—Anabel Ton
(74) *Attorney, Agent, or Firm*—Foley & Lardner

(57) ABSTRACT

In an illuminating apparatus for a projection display, light from a plurality of light sources converge at a respective focal point that coincides with an input side of a corresponding light pipe integrator. The light pipe integrators convert the light incident on the input sides thereof into evenly distributed light that are radiated at output sides thereof and that pass through a principal condenser lens before reaching a plane of a liquid crystal display panel of the projection display.

5 Claims, 1 Drawing Sheet

ILLUMINATING APPARATUS FOR A PROJECTION DISPLAY

BACKGROUND OF THE INVENTION

1. Field of the Invention

The invention relates to an illuminating apparatus, more particularly to an illuminating apparatus that is adapted for use in a projection display.

2. Description of the Related Art

In a conventional projection display, light from an illuminating apparatus is split, modulated and subsequently synthesized to form an image on a display screen. A known illuminating apparatus includes a single light source, the light output of which is processed by a condenser, a beam splitter, a polarization converter, etc., of a projection display so as to form an image on a liquid crystal display panel. In a projection display with a high brightness requirement, the single light source must have a high power rating, which can result in the drawbacks of high temperature and concentration of heat, and in the problem of heat dissipation.

SUMMARY OF THE INVENTION

Therefore, the object of the present invention is to provide an illuminating apparatus that is adapted for use in a projection display and that includes at least two light sources so as to be able to provide a high brightness output without the high temperature and heat concentration drawbacks commonly encountered in the prior art.

According to the present invention, an illuminating apparatus is adapted for use in a projection display that includes a liquid crystal display panel. The illuminating apparatus comprises:

a plurality of light sources, each of which is operable so as to generate light that converges at a respective focal point;

a plurality of light pipe integrators corresponding in number to the light sources, each of the light pipe integrators having an input side facing a respective one of the light sources, and an output side adapted to face the liquid crystal display panel, wherein the focal points at which the light from the light sources converge are coincident on the input sides of the light pipe integrators, respectively, the light pipe integrators converting the light incident on the input sides thereof into evenly distributed light that are radiated at the output sides thereof;

a plurality of first lenses corresponding in number to the light pipe integrators, each of the first lenses being disposed between a respective one of the light pipe integrators and the liquid crystal display panel; and a principal condenser lens adapted to be disposed between the first lenses and the liquid crystal display panel such that the light from the first lenses converge at points on a plane of the liquid crystal display panel upon exiting the principal condenser lens.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
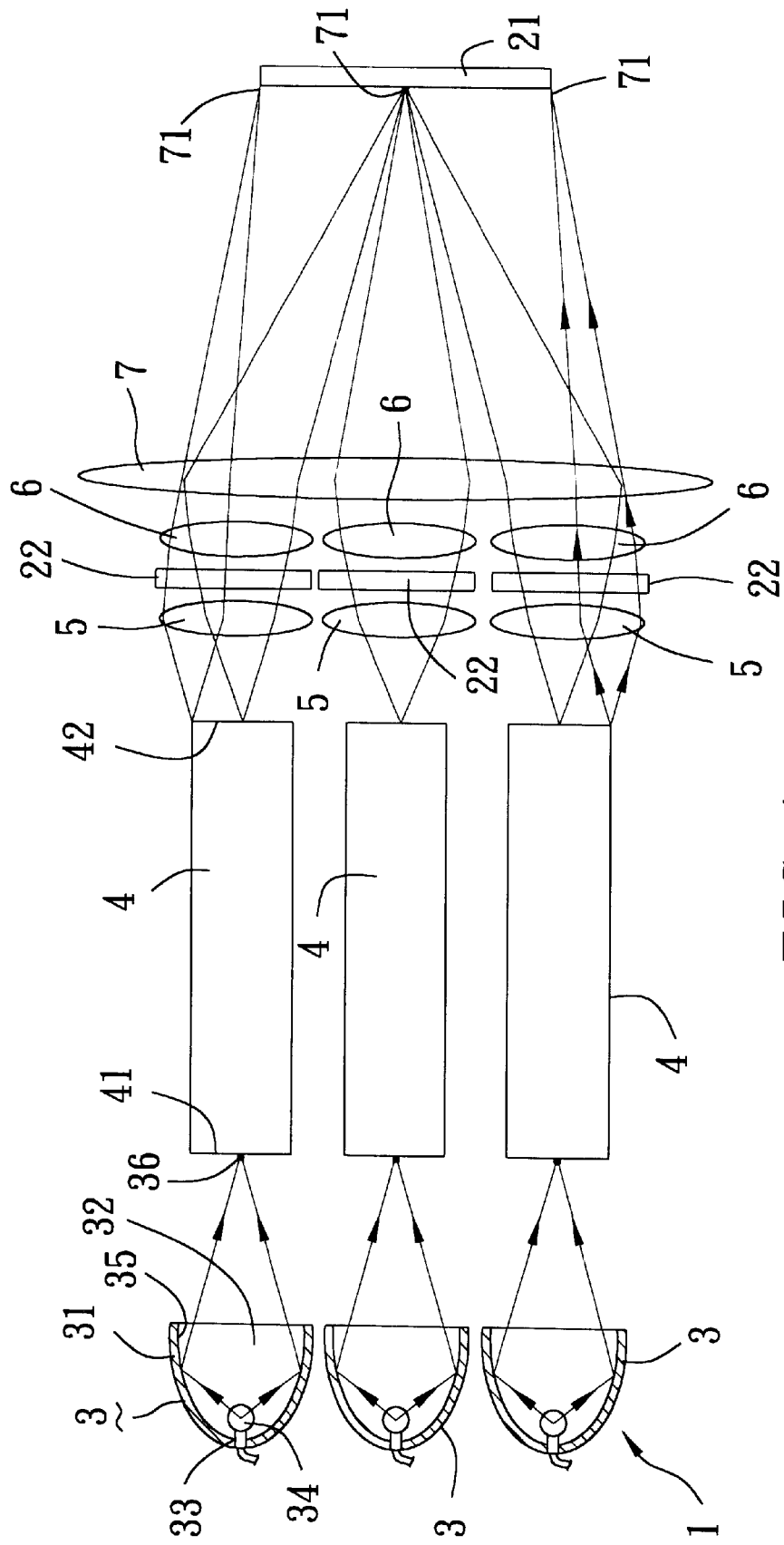
FIG. 1 is a schematic view showing the preferred embodiment of an illuminating apparatus according to the present invention, and the relevant components of a projection display.

Referring to FIG. 1, the preferred embodiment of an illuminating apparatus 1 according to the present invention is shown to be adapted for use in a projection display so as to provide input light to the same. The projection display includes a liquid crystal display panel 21 for displaying an image, and a plurality of polarization converters or P/S converters 22 for polarizing light rays that pass therethrough. In actual practice, the projection display further includes other components, such as condensers, beam splitters, etc., which vary according to the required function. As the exact configuration of the projection display is known in the art and is not pertinent to the present invention, a detailed description of the same is dispensed with herein for the sake of brevity.

The illuminating apparatus 1 includes a plurality of light sources 3, a plurality of light pipe integrators 4, a plurality of first lenses 6, a plurality of second lenses 5, and a principal condenser lens 7. The light sources 3, the light pipe integrators 4, the first lenses 6 and the second lenses 5 correspond in number to the P/S converters 22. In this embodiment, there are three sets of the light sources 3, the light pipe integrators 4, the first lenses 6, and the second lenses 5. The number of sets to be used in the illuminating apparatus 1 depends on the brightness requirement of the projection display.

Each of the light sources 3 includes a reflector 31 in the form of a hemiellipsoid. The reflector 31 has an open end 32 that faces the respective one of the P/S converters 22, and a lamp-mounting end 33 opposite to the open end 32. Each of the light sources 3 further includes a lamp 34 that is mounted in the reflector 31 at the lamp-mounting end 33, and that is disposed at a first focal point of the reflector 31. The reflector 31 has a reflective inner wall surface 35 such that the light radiated by the lamp 34 will converge at a second focal point 36 of the reflector 31. The second focal points 36 of. the reflectors 31 of the light sources 3 are disposed on a common plane.

Each of the light pipe integrators 4 is preferably in the form of a solid glass rod or a hollow pipe with a reflective inner wall surface. Each of the light pipe integrators 4 is disposed horizontally between a corresponding one of the light sources 3 and a corresponding one of the P/S converters 22. Each of the light pipe integrators 4 has an input side 41 that faces the corresponding one of the light sources 3 and that is coincident with the second focal point 36 of the reflector 31 of the corresponding one of the light sources 3, and an output side 42 opposite to the input side 41 and facing the corresponding one of the P/S converters 22. The input and output sides 41, 42 have parallel side faces. By virtue of the total internal reflection properties of the light pipe integrators 4, light rays that are incident on the input side 41 can be converted into evenly distributed light that is radiated at the output side 42. The greater the number of total internal reflections, the better will be the uniform distribution of the light at the output side 42.

Each of the second lenses 5 is disposed between the output side 42 of a respective one of the light pipe integrators 4 and a respective one of the P/S converters 22. Each of the second lenses 5 is preferably in the form of a positive lens, or a positive-focus lens set that includes a number of lenses. Each of the second lenses 5 has an imaging capability such that an image of a virtual point-light source radiated at the input side 41 of the respective one of the light pipe integrators 4 will be formed by the second lens 5 to result in a smaller incident angle upon reaching the respective one of the P/S converters 22, which subsequently polarizes the point-light source in a known manner. The arrangement as such results in a high polarization conversion efficiency.

Each of the first lenses 6 is disposed between a corresponding one of the P/S converters 22 and the liquid crystal display panel 21. Thus, the first and second lenses 6, 5 are disposed on opposite ends of the P/S converters 22. Like the second lenses 5, each of the first lenses 6 is preferably formed from a positive lens or a lens set. The first and second lenses 6, 5 can project the uniform light from the output side 42 toward the liquid crystal display panel 21.

The principal condenser lens 7 is disposed between the first lenses 6 and the liquid crystal display panel 21, and has an area sufficient to encompass the light that exit all of the first lenses 6. The principal condenser lens 7 is preferably in the form of a single positive lens with a light-condensing capability, or a light-condensing lens set. The light that exit the principal condenser lens 7 converge at points 71 on the plane of the liquid crystal display panel 21.

In view of the aforesaid construction of the illuminating apparatus 1, light from all of the light sources 3 can be evenly distributed into a plurality of point-light sources that are incident on the liquid crystal display panel 21. The P/S converters 22 are designed to be disposed in front of the light pipe integrators 4 in view of the smaller dispersion angle of the latter. The number of the light sources 3, the light pipe integrators 4, the second lenses 5, and the first lenses 6 can be varied in accordance with the brightness requirement. Moreover, the point-light sources are obtained by condensing the light from the plurality of low-power light sources 3. As such, even with the high brightness requirement, because the low-power light sources 3 are in use, the heat generated by each of the light sources 3 is relatively small and can be easily dissipated. Furthermore, when any one of the light sources 3 breaks down, the effect thereof will only be a lower brightness output, and will not result in failure of the illuminating apparatus 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An illuminating apparatus adapted for use in a projection display that includes a liquid crystal display panel, said illuminating apparatus comprising:

a plurality of light sources, each of which is operable so as to generate light that converges at a respective focal point;

a plurality of light pipe integrators corresponding in number to said light sources, each of said light pipe integrators having an input side facing a respective one of said light sources, and an output side adapted to face the liquid crystal display panel, wherein the focal points at which the light from said light sources converge are coincident on said input sides of said light pipe integrators, respectively, said light pipe integrators converting the light incident on said input sides thereof into evenly distributed light that are radiated at said output sides thereof;

a plurality of first lenses corresponding in number to said light pipe integrators, each of said first lenses being disposed between a respective one of said light pipe integrators and the liquid crystal display panel;

a plurality of polarization converters corresponding in number to said light pipe integrators, each of said polarization converters being disposed between a respective one of said light pipe integrators and a respective one of said first lenses;

a plurality of second lenses corresponding in number to said light pipe integrators, each of said second lenses being disposed between a respective one of said light pipe integrators and a respective one of said polarization converters, and forming an image of a virtual point-light source radiated at said input side of the respective one of said light pipe integrators to result in a smaller incident angle upon reaching the respective one of said polarization converters; and a principal condenser lens adapted to be disposed between said first lenses and the liquid crystal display panel such that the light from said first lenses converge at points on a plane of the liquid crystal display panel upon exiting said principal condenser lens.

2. The illuminating apparatus of claim 1, wherein the focal points at which the light from said light sources converge are disposed on a common plane.

3. The illuminating apparatus of claim 1, wherein each of said light sources includes a hemiellipsoid reflector, and a lamp mounted in said reflector.

4. The illuminating apparatus of claim 1, wherein each of said light pipe integrators is formed as a solid glass rod.

5. The illuminating apparatus of claim 1, wherein each of said light pipe integrators is formed as a hollow pipe with a reflective inner wall surface.

* * * * *